United States Patent
Ostergren et al.

(10) Patent No.: US 8,591,341 B2
(45) Date of Patent: Nov. 26, 2013

(54) USER TO USER GAME REFERRALS

(75) Inventors: Brian Ostergren, Redmond, WA (US); Trisha Eileen Stouffer, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/493,646

(22) Filed: Jun. 11, 2012

(65) Prior Publication Data

US 2012/0244941 A1 Sep. 27, 2012

Related U.S. Application Data

(62) Division of application No. 11/926,545, filed on Oct. 29, 2007, now Pat. No. 8,197,313.

(51) Int. Cl.
*A63F 9/24* (2006.01)

(52) U.S. Cl.
USPC ............................................. 463/42

(58) Field of Classification Search
USPC ............................................. 463/42
See application file for complete search history.

(56) References Cited

U.S. PATENT DOCUMENTS

| | | | |
|---|---|---|---|
| 5,222,236 A | 6/1993 | Potash et al. | |
| 5,846,132 A | 12/1998 | Junkin | |
| 6,224,485 B1 | 5/2001 | Dickinson et al. | |
| 6,341,279 B1 * | 1/2002 | Nye | 1/1 |
| 6,699,125 B2 | 3/2004 | Kirmse et al. | |
| 6,852,033 B2 | 2/2005 | Kinjo et al. | |
| 6,881,148 B2 | 4/2005 | Yotsugi et al. | |
| 7,056,217 B1 | 6/2006 | Pelkey et al. | |
| 7,090,577 B2 | 8/2006 | Serizawa et al. | |
| 7,240,093 B1 | 7/2007 | Danieli et al. | |
| 7,311,608 B1 | 12/2007 | Danieli et al. | |
| 7,441,151 B2 | 10/2008 | Whitten et al. | |
| 7,693,950 B2 * | 4/2010 | Foulger et al. | 709/206 |
| 7,774,417 B2 * | 8/2010 | Callanan et al. | 709/206 |
| 7,958,234 B2 * | 6/2011 | Thomas et al. | 709/224 |
| 2002/0086732 A1 | 7/2002 | Kirmse et al. | |
| 2002/0160838 A1 | 10/2002 | Kim | |
| 2003/0204566 A1 | 10/2003 | Dhupelia et al. | |
| 2003/0233537 A1 | 12/2003 | Wohlgemuth et al. | |
| 2004/0162144 A1 | 8/2004 | Loose et al. | |
| 2004/0192440 A1 | 9/2004 | Evans et al. | |
| 2004/0220850 A1 | 11/2004 | Ferrer et al. | |
| 2005/0004840 A1 | 1/2005 | Wanninger | |
| 2005/0070359 A1 | 3/2005 | Rodriquez et al. | |
| 2005/0091108 A1 | 4/2005 | Frost | |

(Continued)

FOREIGN PATENT DOCUMENTS

| | | | |
|---|---|---|---|
| EP | 1052588 A3 | 5/2002 | |
| WO | 0101307 A2 | 1/2001 | |

OTHER PUBLICATIONS

U.S. Appl. No. 13/608,407, filed Sep. 10, 2012.
Office Action dated Dec. 26, 2012 in U.S. Appl. No. 13/608,407.

(Continued)

*Primary Examiner* — Corbett B Coburn
(74) *Attorney, Agent, or Firm* — Vierra Magen Marcus LLP

(57) ABSTRACT

A method is disclosed in a gaming and media system for quickly and easily creating and sending mail communications including pre-populated, or preformed, messages. Upon receipt of a communication, a recipient may also quickly and easily download a game discussed in the message.

20 Claims, 8 Drawing Sheets

(56) References Cited

U.S. PATENT DOCUMENTS

| | | |
|---|---|---|
| 2005/0096982 A1 | 5/2005 | Morton et al. |
| 2005/0114526 A1 | 5/2005 | Aoyama |
| 2005/0209002 A1 | 9/2005 | Blythe et al. |
| 2005/0239550 A1 | 10/2005 | Hardisty et al. |
| 2005/0282628 A1 | 12/2005 | Beatty et al. |
| 2006/0003841 A1 | 1/2006 | Kobayashi et al. |
| 2006/0121973 A1 | 6/2006 | Parisien |
| 2006/0121986 A1 | 6/2006 | Pelkey et al. |
| 2006/0121992 A1 | 6/2006 | Bortnik et al. |
| 2006/0122716 A1 | 6/2006 | Bortnik et al. |
| 2006/0199646 A1 | 9/2006 | Kogo |
| 2006/0258460 A1 | 11/2006 | Crawford et al. |
| 2006/0287099 A1 | 12/2006 | Shaw et al. |
| 2007/0005704 A1 | 1/2007 | Heron et al. |
| 2007/0060317 A1 | 3/2007 | Martin |
| 2007/0060368 A1 | 3/2007 | Cheng |
| 2007/0117635 A1 | 5/2007 | Spanton et al. |
| 2007/0173325 A1 | 7/2007 | Shaw et al. |
| 2007/0191101 A1 | 8/2007 | Coliz et al. |
| 2008/0039209 A1 | 2/2008 | Chen et al. |
| 2009/0082101 A1 | 3/2009 | Ostergren et al. |
| 2009/0111576 A1 | 4/2009 | Ostergren et al. |
| 2009/0239666 A1 | 9/2009 | Hall et al. |
| 2011/0312398 A1 | 12/2011 | Ziegler et al. |
| 2012/0011189 A1 | 1/2012 | Werner et al. |

OTHER PUBLICATIONS

Office Action dated Aug. 27, 2012 in Israeli Patent Application No. 204268.
Notice of Allowance dated May 10, 2012 in U.S. Appl. No. 11/859,194.
Office Action dated May 3, 2012 in Chinese Patent Application No. 200880113481.X.
Response to Office Action dated Jul. 3, 2012 in Chinese Patent Application No. 200880113481.X.
Monsarrat, "Adapting Massively Multiplayer Internet Computer Games to the Mainstream Market: A Business Plan for Turbine Entertainment Software," May 18, 2000 http://dspace.mit.edu/bitstream/1721.1/32707/1/49340604.pdf.
Christoph et al., "PunkBuster for Players," May 18, 2004 http://www.evenbalance.com/publications/aa-pl/.
Achievements: Your Gaming Legacy, Microsoft Corporation, 2007, <retrieved from Internet Jul. 5, 2007> http://www.xbox.com/en-US/games/tips/achievements.htm.
Dashboard Enhancements, Design and Content, XBox 360 Spring 2007 Update Review, 2005-2007 Ronald Heft, Jr., May 9, 2007 http://cavemonkey50.com/2007/05/xbox-360-update-review/.
PlayStation Home Combines the Best of Nintendo's Miis, A Few Xbox 360 Achievements, Second Life, and the Sims, GIZMODO, Mar. 7, 2007 http://gizmodo.com/gadgets/home-entertainment/playstation-home-combines-the-best-of-nintendos-miis-a-few-xbox-360-achievements-second-life-and-the-sims-242148.php.
Playstation3 Home Information Thread, 2007 Sony Computer Entertainment America Inc., Mar. 8, 2007 http://boardsus.playstation.com/playstation/board/message?board.id=ps3home&thread.id=363.
Office Action dated Feb. 16, 2011, U.S. Appl. No. 11/925,057.
International Search Report and Written Opinion dated Jul. 15, 2009, Application No. PCT/US2008/080597.
Subramani et al., Knowledge-Sharing and Influence in Online Social Networks via Viral Marketing, Communications of the ACM, Dec. 2003/vol. 46, No. 12ve, pp. 300-307, http://delivery.acm.org/10.1145/960000/953514/p300-subramani.pdf?key1=953514&key2=6249543811&coll=GUIDE&dl=GUIDE&CFID=17286036&CFTOKEN=40030580.
Response to Office Action filed May 31, 2011, U.S. Appl. No. 11/925,057.
Final Office Action dated Jun. 10, 2011, U.S. Appl. No. 11/925,057.
Office Action dated Jul. 14, 2011, U.S. Appl. No. 11/859,194.
INKLINK, Atom Entertainment, Inc., 2007, <retrieved from Internet Jul. 4, 2007> http://www.shockwave.com/gamelanding/inklink.jsp.
Microsoft Corporation, Xbox 360, Complete Dashboard Update Feature List, Nov. 2006 http://en.wikipedia.org/wiki/Xbox_Live_Arcade.
Response to Final Office Action filed Nov. 10, 2011 in U.S. Appl. No. 11/925,057.
Response to Office Action filed Nov. 14, 2011, U.S. Appl. No. 11/859,194.
Final Office Action mailed Jan. 24, 2012, U.S. Appl. No. 11/859,194.
Response to Final Office Action filed Apr. 24, 2012, U.S. Appl. No. 11/859,194.
Office Action mailed Jul. 28, 2011 in U.S. Appl. No. 11/926,545.
Response to Office Action filed Aug. 26, 2011 in U.S. Appl. No. 11/926,545.
Office Action mailed Sep. 8, 2011 in U.S. Appl. No. 11/926,545.
Response to Office Action filed Jan. 9, 2012 in U.S. Appl. No. 11/926,545.
Notice of Allowance and Fee(s) Due mailed Jan. 31, 2012 in U.S. Appl. No. 11/926,545.
Response to Office Action filed Mar. 22, 2013 in U.S. Appl. No. 13/608,407.
Response to Office Action filed Feb. 26, 2013 in Israeli Patent Application No. 204268.
Office Action dated Mar. 27, 2013 in U.S. Appl. No. 11/925,057.
Office Action dated Jun. 13, 2013 in U.S. Appl. No. 13/608,407.
Response to Office Action filed Jun. 17, 2013 in U.S. Appl. No. 13/608,407.
Response to Office Action filed Jul. 29, 2013 in U.S. Appl. No. 11/925,057.
Notice of Allowance and Fee(s) Due dated Sep. 6, 2013 in U.S. Appl. No. 13/608,407.
Final Office Action dated Sep. 13, 2013 in U.S. Appl. No. 11/925,057.

* cited by examiner

USER TO USER GAME REFERRALS

CLAIM OF PRIORITY

This application is a divisional application of U.S. patent application Ser. No. 11/926,545, entitled "USER TO USER GAME REFERRALS," filed Oct. 29, 2007, which is incorporated herein by reference in its entirety.

BACKGROUND

Gaming systems have evolved from those which provided an isolated gaming experience to networked systems providing a rich, interactive experience which may be shared in real time between friends and other gamers. With Microsoft's Xbox® video game system and Xbox Live® online game service, users can now easily communicate with each other while playing to share the gaming experience. Moreover, when not playing in tandem, current gaming systems allow friends to track others' gaming experiences and accomplishments.

One way in which users track their and their friends' progress through different games is through the concept of game scores and achievements. As gamers progress through a game and complete game-specific challenges, such as getting to a new level or amassing a specified number of wins against other players, the Xbox Live service keeps track of scores and achievements for Xbox Live service subscribers. Where once a gamer's scores and achievements were only seen by him or her, gamers are now able to see the real time progress of others, either while logged on to the Xbox Live service via an Xbox game console or online. Game progress has become a highly visible measure associated with users, and the keeping and posting of scores and achievement data has evolved into a strong selling point for the Xbox platform and games. Friends and users now compete with each other for the highest scores and most achievements.

Another innovation in current gaming systems is the ability to quickly and easily download games. For example, Microsoft introduced a gaming disc known as Microsoft Arcade which is able to connect to a server through the Internet when the gaming console is connected to the Internet. From the server site, the Arcade gaming disc is able to enumerate full version games which are available for download to the user's hard disc drive on the XBox console. In the past, when a user learned of a game through a friend or otherwise, the user either had to go to a store to purchase the game media, or have the media delivered after an online purchase. With the passage of time and difficulty involved in the purchase, users often lost interest and did not follow through with the purchase. However, platforms such as Microsoft Arcade allow users to obtain games as soon as they learn about them.

It is known to incorporate a mail messaging system in a gaming and media system whereby users can send messages to friends and other players while the users are gaming. Using this mail messaging system, users commonly share their thoughts and experiences on a particular game they are playing and commonly boast of their accomplishments in the game. If the message recipient is gaming online, the recipient may be alerted that a message has arrived and they may view the message while they are gaming. Back and forth communications are thus enabled, for example to allow users to share their thoughts and experiences while playing the same or different games.

Accessing and using current mail messaging systems while gaming is currently burdensome. As one example, using the gaming keyboard to create a mail message is time consuming. Moreover, current mail messaging systems do not take advantage of the viral marketing opportunities presented. For example, a user may send an email to a friend letting the friend know how much fun the user is having playing a particular game. If the friend is sufficiently intrigued to buy the game, they must maneuver through a plurality of different user interface screens before they are able to arrive at an option allowing the friend to download the game. Features such as mail messaging systems and the ability to download games have increased interest and sales in gaming platforms. However, there is room for greater synergy between these features.

SUMMARY

Embodiments of the present system relate to a gaming and media system in which a user may quickly and easily create and send mail communications including pre-populated, or preformed, messages. Embodiments also relate to a system in which a recipient of a message may quickly and easily download a game discussed in the message. In embodiments of the present system, a plurality of preformed messages may be stored in memory. These preformed messages may be generic to a plurality of games and relate to at least one of: a) a user's opinion of a game; b) one or more accomplishments of the user within the game; and c) a challenge to recipients of the preformed message to improve upon the user's accomplishments in the game.

When a user wishes to send communications according to the present system, one or more of the preformed messages are retrieved from memory. The generic preformed messages retrieved from memory include placeholders at which customized information relating to the game being played by the user may be inserted. For example, the specific name of the game being played may be inserted into the generic preformed messages. Additionally, the real time, stored information relating to realized achievements and overall score of the user in the game being played may also be inserted into the generic preformed messages. The results are preformed messages including customized game information. These preformed messages are displayed to the user, and the user may select one or more of them to quickly and easily send to friends and other recipients via a network mail messaging system associated with the gaming and media system.

Upon receiving a message, recipients may wish to play the game as well. In addition to making the creation of these messages easy, the present system also makes it easy to download the game the sender is playing. In particular, the message displayed to recipients may include a direct link to a download location from which recipients may download the game discussed in the message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
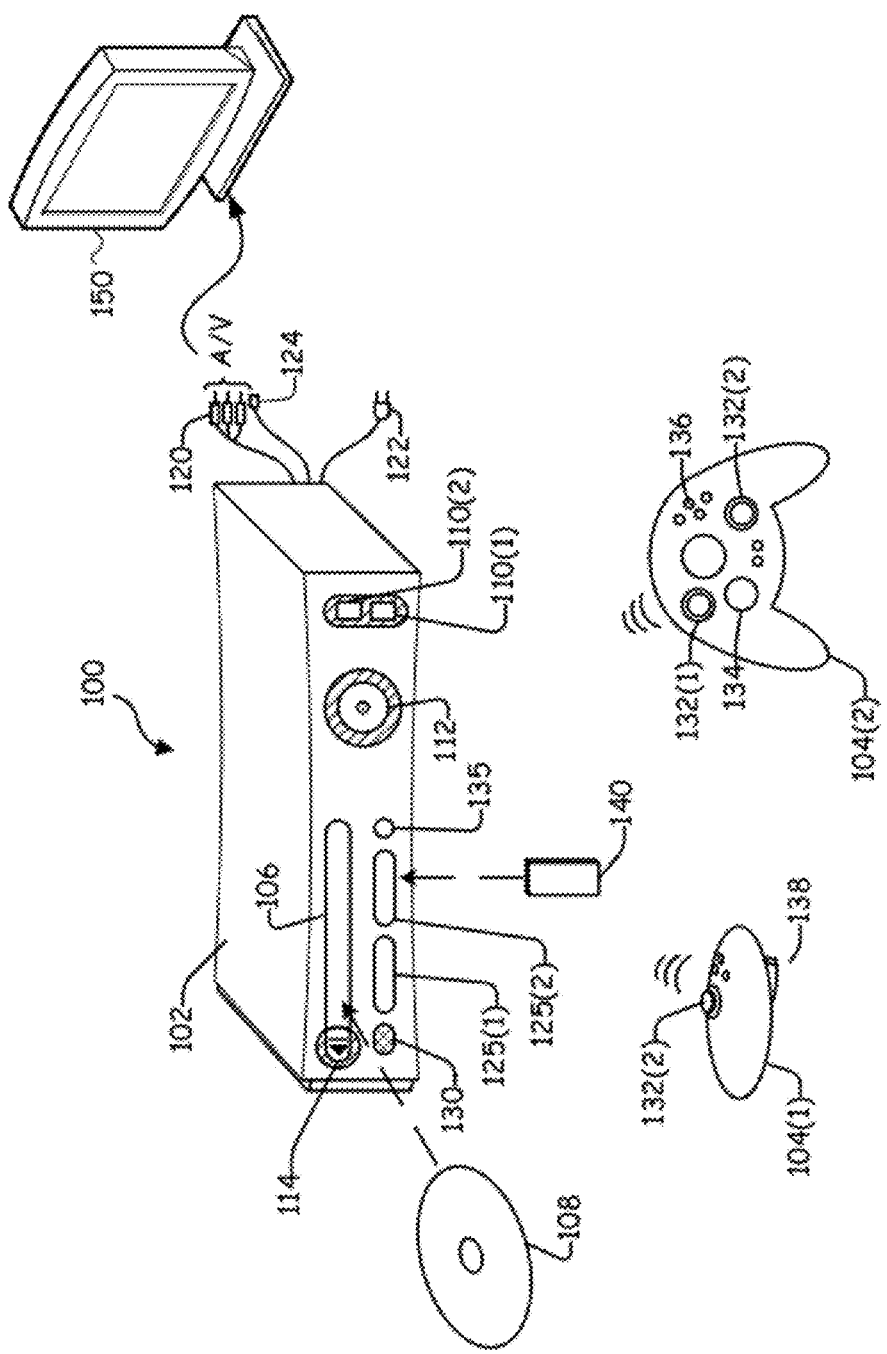
FIG. 1 is an isometric view of an exemplary gaming and media system.

The present system will now be described with reference to FIGS. 1-8, which in general relate to a gaming and media system in which a user may quickly and easily create and send mail communications including pre-populated, or preformed, messages. Embodiments also relate to a system in which a recipient of a message may quickly and easily download a game discussed in the message. FIG. 1 shows an exemplary gaming and media system 100. The following discussion of FIG. 1 is intended to provide a brief, general description of a suitable environment in which concepts presented herein may be implemented. As shown in FIG. 1, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that support various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (such as monitor 150) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers 104 are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation, a memory unit (MU) 140 may also be inserted into controller 104 to provide additional and portable storage. Portable MUs enable users to store game parameters for use when playing on other consoles. In this implementation, each controller is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 108), from an online source, or from MU 140. Samples of the types of media that gaming and media system 100 is capable of playing include:

Game titles played from CD and DVD discs, from the hard disk drive, or from an online source.

Digital music played from a CD in portable media drive 106, from a file on the hard disk drive (e.g., music in the Windows Media Audio (WMA) format), or from online streaming sources.

Digital audio/video played from a DVD disc in portable media drive 106, from a file on the hard disk drive (e.g., Active Streaming Format), or from online streaming sources.

During operation, console 102 is configured to receive input from controllers 104 and display information on display 150. For example, console 102 can display a user interface on display 150 to allow a user to select a game using controller 104 and display achievement information as discussed below.

Figure 2:
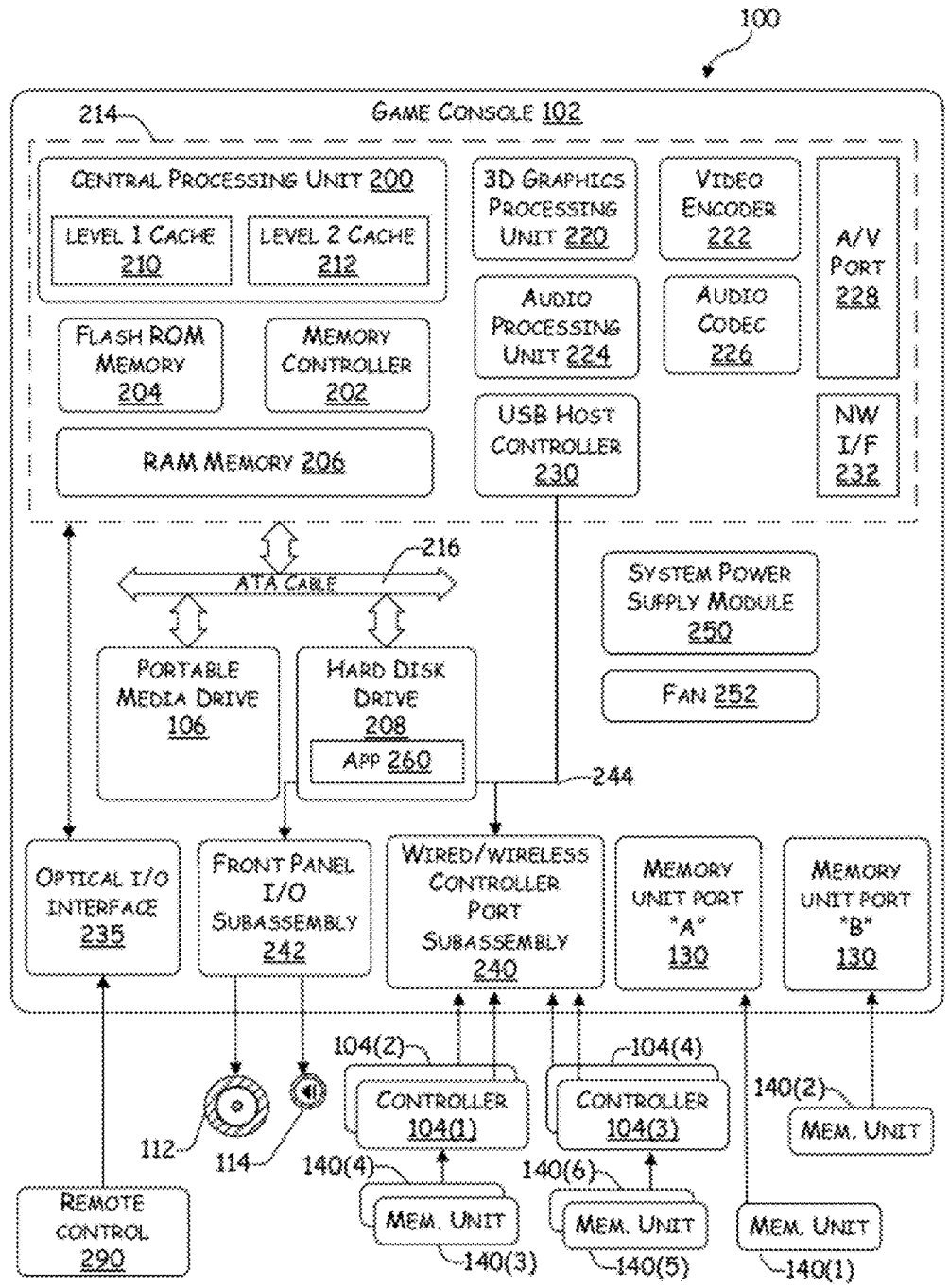
FIG. 2 is an exemplary functional block diagram of components of the gaming and media system shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 2, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202.

A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community, as discussed below in connection with FIG. 3.

Figure 3:
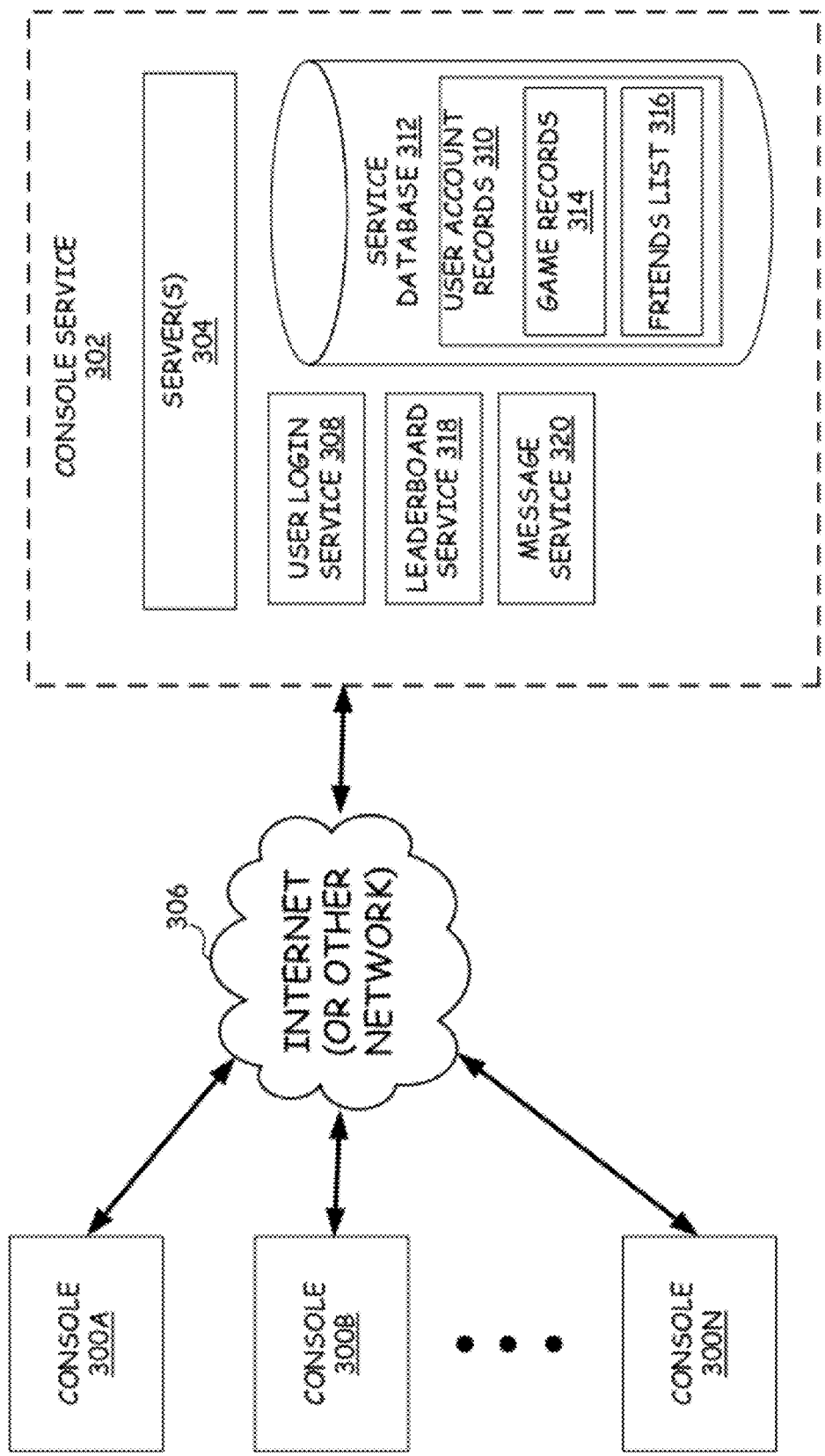
FIG. 3 is a block diagram of an exemplary operating environment for rendering achievement information.

FIG. 3 provides a block diagram of multiple consoles 300A-300N networked with a console service 302 having one or more servers 304 through a network 306. In one embodiment, network 306 comprises the Internet, though other networks such as LAN or WAN are contemplated. Server(s) 304 include a communication component capable of receiving information from and transmitting information to consoles 300A-N and provide a collection of services that applications running on consoles 300A-N may invoke and utilize.

For example, consoles 300A-N may invoke user login service 308, which is used to authenticate a user on consoles 300A-N. During login, login service 308 obtains a gamer tag (a unique identifier associated with the user) and a password from the user as well as a console identifier that uniquely identifies the console that the user is using and a network path to the console. The gamer tag and password are authenticated by comparing them to user records 310 in a database 312, which may be located on the same server as user login service 308 or may be distributed on a different server or a collection of different servers. Once authenticated, user login service 308 stores the console identifier and the network path in user records 310 so that messages and information may be sent to the console.

User records 310 can include additional information about the user such as game records 314 and friends list 316. Game records 314 include information for a user identified by a gamer tag and can include statistics for a particular game, achievements acquired for a particular game and/or other game specific information as desired.

Friends list 316 includes an indication of friends of a user that are also connected to or otherwise have user account records with console service 302. The term "friend" as used herein can broadly refer to a relationship between a user and another gamer, where the user has requested that the other gamer consent to be added to the user's friends list, and the other gamer has accepted. This may be referred to as a two-way acceptance. A two-way friend acceptance may also be created where another gamer requests the user be added to the other gamer's friends list and the user accepts. At this point, the other gamer may also be added to the user's friends list. While friends will typically result from a two-way acceptance, it is conceivable that another gamer be added to a user's friends list, and be considered a "friend," where the user has designated another gamer as a friend regardless of whether the other gamer accepts. It is also conceivable that another gamer will be added to a user's friends list, and be considered a "friend," where the other user has requested to be added to the user's friends list, or where the user has requested to be added to the other gamer's friends list, regardless of whether the user or other gamer accepts in either case.

Friends list 316 can be used to create a sense of community of users of console service 302. Users can select other users to be added to their friends list 316 and view information about their friends such as game performance, current online status, friends list, etc.

User records 310 also include additional information about the user including games that have been downloaded by the user and licensing packages that have been issued for those downloaded games, including the permissions associated with each licensing package. Portions of user records 310 can be stored on an individual console, in database 312 or on both. If an individual console retains game records 314 and/or friends list 316, this information can be provided to console service 302 through network 306. Additionally, the console has the ability to display information associated with game records 314 and/or friends list 316 without having a connection to console service 302.

Server(s) 304 also include a mail message service 320 which permits one console, such as console 300A, to send a message to another console, such as console 300B. The message service 320 is known, the ability to compose and send messages from a console of a user is known, and the ability to receive and open messages at a console of a recipient is known. Mail messages can include emails, text messages, voice messages, attachments and specialized in-text messages known as invites, in which a user playing the game on one console invites a user on another console to play in the same game while using network 306 to pass gaming data between the two consoles so that the two users are playing from the same session of the game. Friends list 316 can also be used in conjunction with message service 320.

Figure 4:
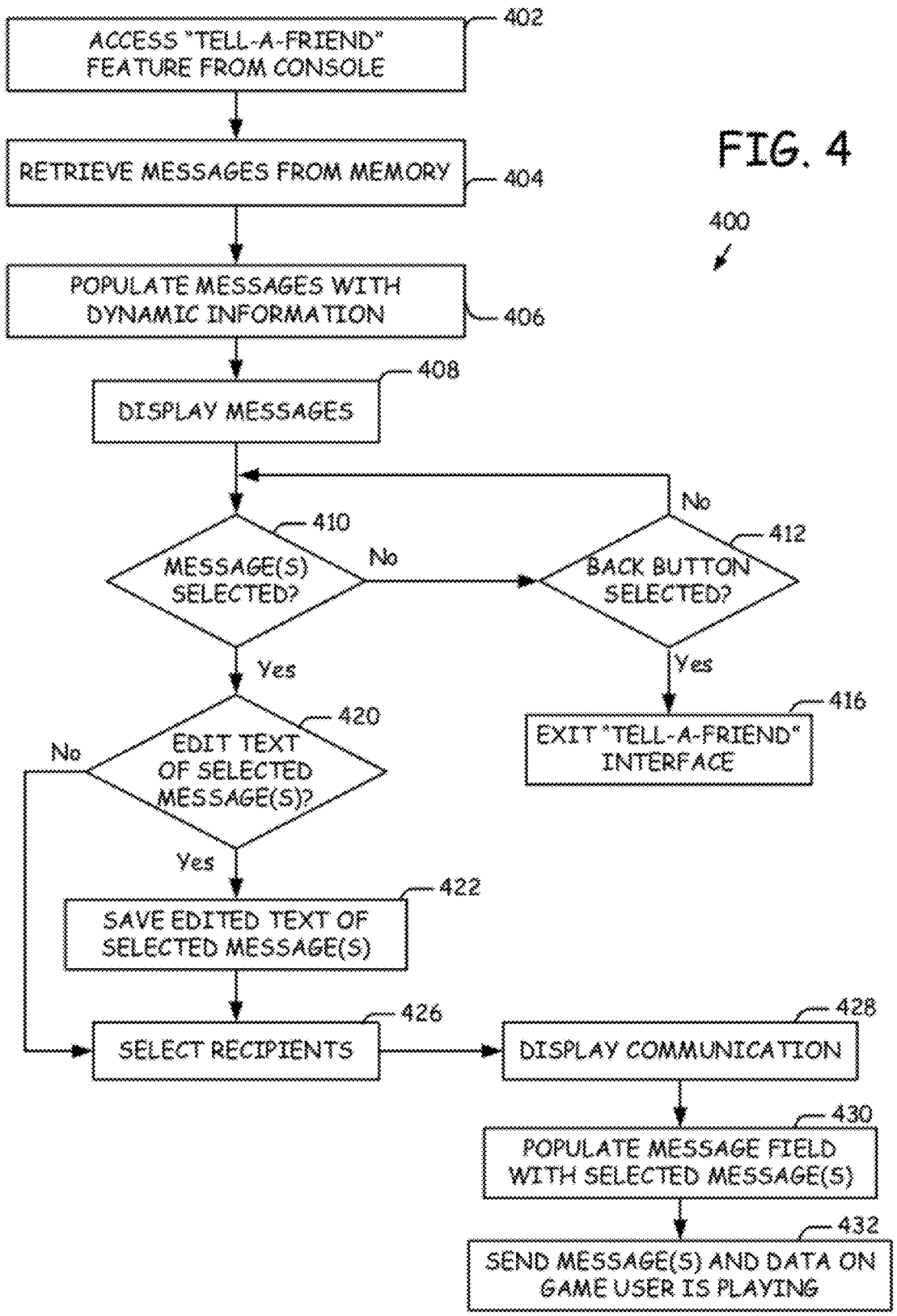
FIG. 4 is a flow diagram of a method for generating and sending preformed messages to one or more recipients.

FIG. 4 is a flow diagram of a method 400 for quickly and easily creating and sending preformed mail messages. This feature may be referred to herein as the "tell-a-friend" feature. In general, a user may access the tell-a-friend option while the user is playing a particular game so that the user may quickly and easily send mail messages to friends and other recipients to describe features and merits of the game. The tell-a-friend feature may also be used to inform the user's friends and other recipients of the user's accomplishments within the game. Upon receiving these messages, recipients may wish to play the game as well. In addition to making the creation of these messages easy, the present system also makes it easy to download the game the sender is playing as explained hereinafter.

In step 402, the user may access the tell-a-friend feature from the user's console in a known manner. For example, this option may be included as a menu option on a system level user interface screen. Alternatively, a button on the user console 300 may be dedicated to accessing the tell-a-friend option. Once the user accesses the tell-a-friend feature in step 402, one or more preformed messages are retrieved from memory in step 404. The memory may be local to the user's gaming and media center, or the memory may be in console service 302.

The preformed messages are messages that a user would commonly send regarding the game that he or she is playing. As indicated above, these messages may convey information about the game the user is playing. Preformed messages may also express a like or dislike for a particular game, and may also express that the recipient should or should not play a particular game. Preformed messages may alternatively relate to a user's accomplishments within a given game. For example, a preformed message may express the number of achievements earned in a particular game and/or how many points the user has acquired in a particular game. The preformed messages may further relate to a user's score in a given game. The preformed messages may also issue challenges and/or include boastful statements intended to pique the recipient's interest in playing the subject game and bettering the user's accomplishments.

It is understood that preformed messages may be stored in memory covering a wide variety of other topics relating to a game. It is also understood that the number of preformed messages stored in memory may vary greatly. The preformed messages may be stored in memory by the operating system of the gaming and media system, or may be downloaded from memory upon downloading of a game. A user may additionally or alternatively create preformed messages which are stored in memory for later use by the user.

The messages stored in memory may be generic to a plurality of different games. That is, the same preformed messages stored in memory may be used in a wide variety of games the user may play. However, each preformed message may include placeholders for receiving dynamic information that customizes the preformed message to the particular game the user is playing when the message is sent. The customization of preformed messages with dynamic information is as explained as follows.

A user may access the tell-a-friend option while the user is playing a particular game so that the user may quickly and easily describe features of that game and/or accomplishments of the user within that game. Accordingly, in order to customize the generic preformed messages stored in memory, the preformed messages may include one or more placeholders for insertion of dynamic information relating to the game the user is playing when the tell-a-friend option is used.

The placeholders may call for dynamic information to be inserted into the preformed messages in step 406, at the position of the placeholders. The placeholders may include an identifier for identifying the type of dynamic information to be inserted at the placeholder. For example, a preformed message may be "Check out [name] in X-Box Live Arcade!". In this preformed message, the placeholder [name] is an identifier calling for the name of the game then being played by the user. The identifiers preferably operate with the dynamic information from each game. Thus, when a user plays a first game, the preformed message will be displayed with the name of the first game. However, when a user plays a second game, the preformed message will be displayed with the name of the second game.

The placeholders may be other identifiers which call other dynamic information from memory for a given game, such as the number of achievements, points, and/or scores obtained by the user in the game the user is playing. All of this information is maintained in memory while the user is playing the game, such as for example in game records 314 (FIG. 3), and may be assimilated into a preformed message by the system processor.

The information such as the number of achievements, points and score may also updated in real time. Thus, if a user selects a preformed message including the user's achievements, points and/or scores, the preformed message will include the most up to date information is this regard.

Figure 6:
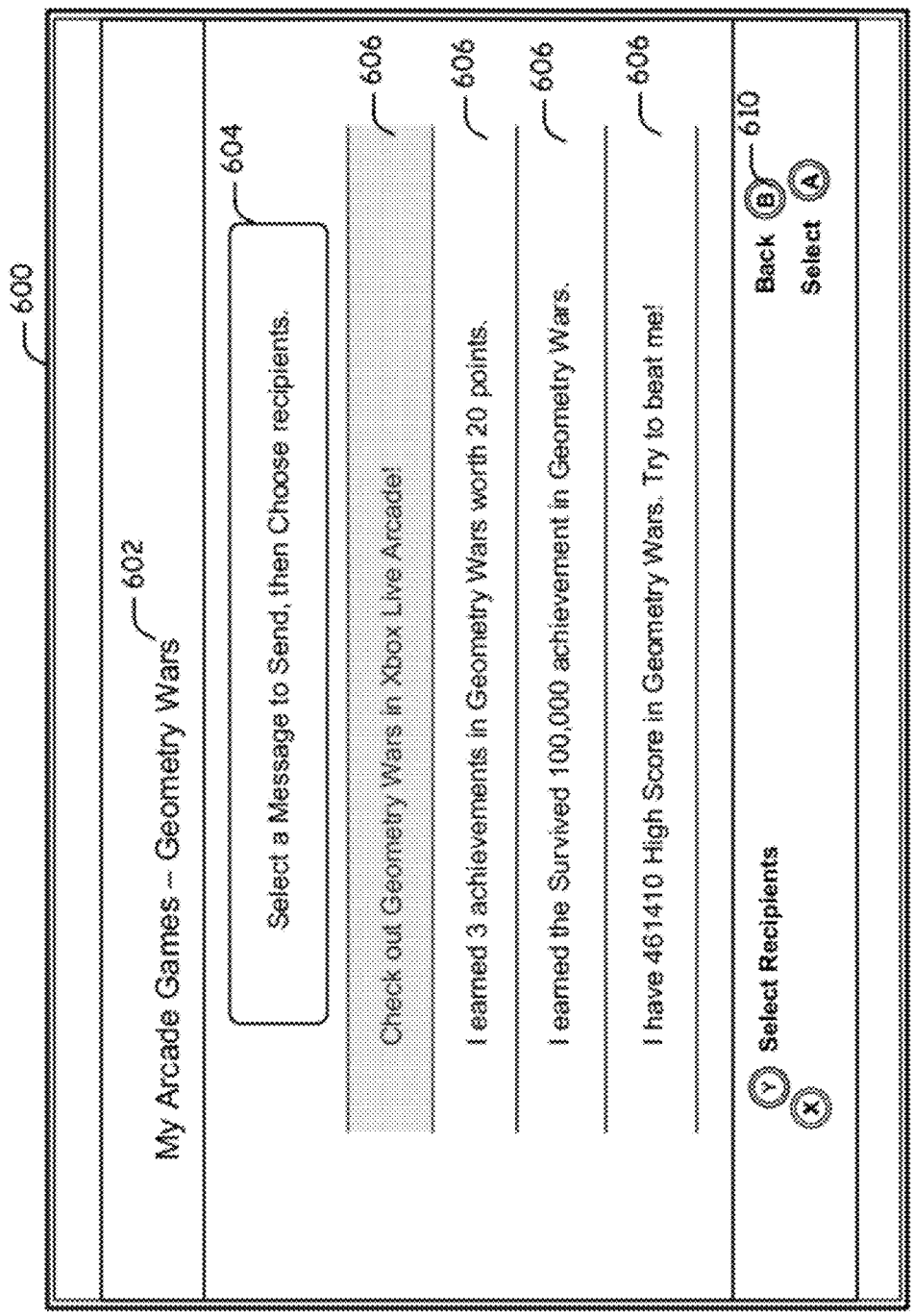
FIG. 6 is an exemplary user interface providing preformed messages according to embodiments of the present system.

In step 408, the preformed messages including the inserted dynamic information may be displayed on a user interface, such as for example user interface 600 shown in FIG. 6. As seen in FIG. 6, the tell-a-friend user interface 600 may include the name 602 of the game being played by the user when the user accesses the tell-a-friend option. The user interface 600 may further include an instruction 604 instructing the user to select one or more preformed messages and then choose one or more recipients to whom the message(s) are to be sent. User interface 600 may further include one or more preformed messages 606. While four such messages are shown in FIG. 6, it is understood that less than or greater than four messages may be displayed on interface 600. Moreover, it is understood that multiple pages of preformed messages, or a single page of preformed messages with a scroll bar, may be provided so that a user may select from a greater number of preformed messages than will fit on a user interface 600 at a given time.

A first preformed message in the example of FIG. 6 is "check out Geometry Wars in X-Box Live Arcade!". As indicated above, this preformed message includes a generic message with the name of the game "Geometry Wars" inserted into the preformed message. A second preformed message reads "I earned 3 achievements in Geometry Wars worth 20 points." This preformed message may include placeholders for three pieces of dynamic information—the number of achievements (three in this example), the name of the game ("Geometry Wars" in this example), and the number of points obtained by the achievements (twenty in this example). This particular preformed message may thus include three separate placeholders, each identifying a separate piece of information stored in memory which is to be inserted into the preformed message.

A third preformed message in the example of FIG. 6 is "I earned the Survived 100,000 achievement in Geometry Wars. This statement may include a placeholder calling for the name of the most recent or most difficult achievement obtained by the user ("the survived 100,000 achievement" in this example) and the name of the game. A fourth preformed message 606 reads "I have 461610 high score in Geometry Wars. Try to beat me!". This preformed message includes two placeholders, one for insertion of the high score, and a second for insertion of the name. This preformed message further includes a challenge, "Try to beat me!". As indicated above, such challenges and/or boastful statements may be added to others of the preformed messages.

In embodiments, the particular preformed messages displayed in the tell-a-friend user interface 600 may vary, being dictated for example by the progress of the user within the game. For example, the last message 606 in FIG. 6 indicating the user has the high score may only be presented if, in fact, the system determines that that user has the high score.

In step 410, the present system detects whether a user has selected one or more messages. In the example of FIG. 6, the user has selected the first preformed message displayed. It is understood that the preformed messages maybe displayed with check boxes allowing the user to select multiple messages. Alternatively, the user may select multiple messages by holding down the Control key while making selections. If no messages have been selected, the system checks whether a back button 610 has been selected in step 412. If not, the system continues to look for selected messages in step 410. If the back button has been selected in step 412, the system exits the tell-a-friend user interface in step 416.

A user has the option of editing and/or adding to the preformed messages 606 displayed on user interface 600. In step 420, the system determines whether a selected preformed message has been edited. If so, the text of the edited preformed message is saved in a step 422. If no edits were made to selected messages, or after an edited message has been saved, the present system next allows the user to select recipients in a step 426. These recipients may be selected from the user's friend list 316 (FIG. 3) in a known manner. The system may then present the communication to be sent in step 428, either on the tell-a-friend user interface 600 or in a new window.

The communication may be shown addressed to the selected recipients and with the message field of the communication populated with the one or more selected messages in step 430. In embodiments, the message may be edited once displayed in the communication instead of or in addition to in steps 420 and 422. The message may be sent in step 432. Step 432 may further include the step of sending metadata along with the communication. The metadata may include for example the name of the game the user is playing, and an Internet address from where the game may be downloaded.

Figure 5:
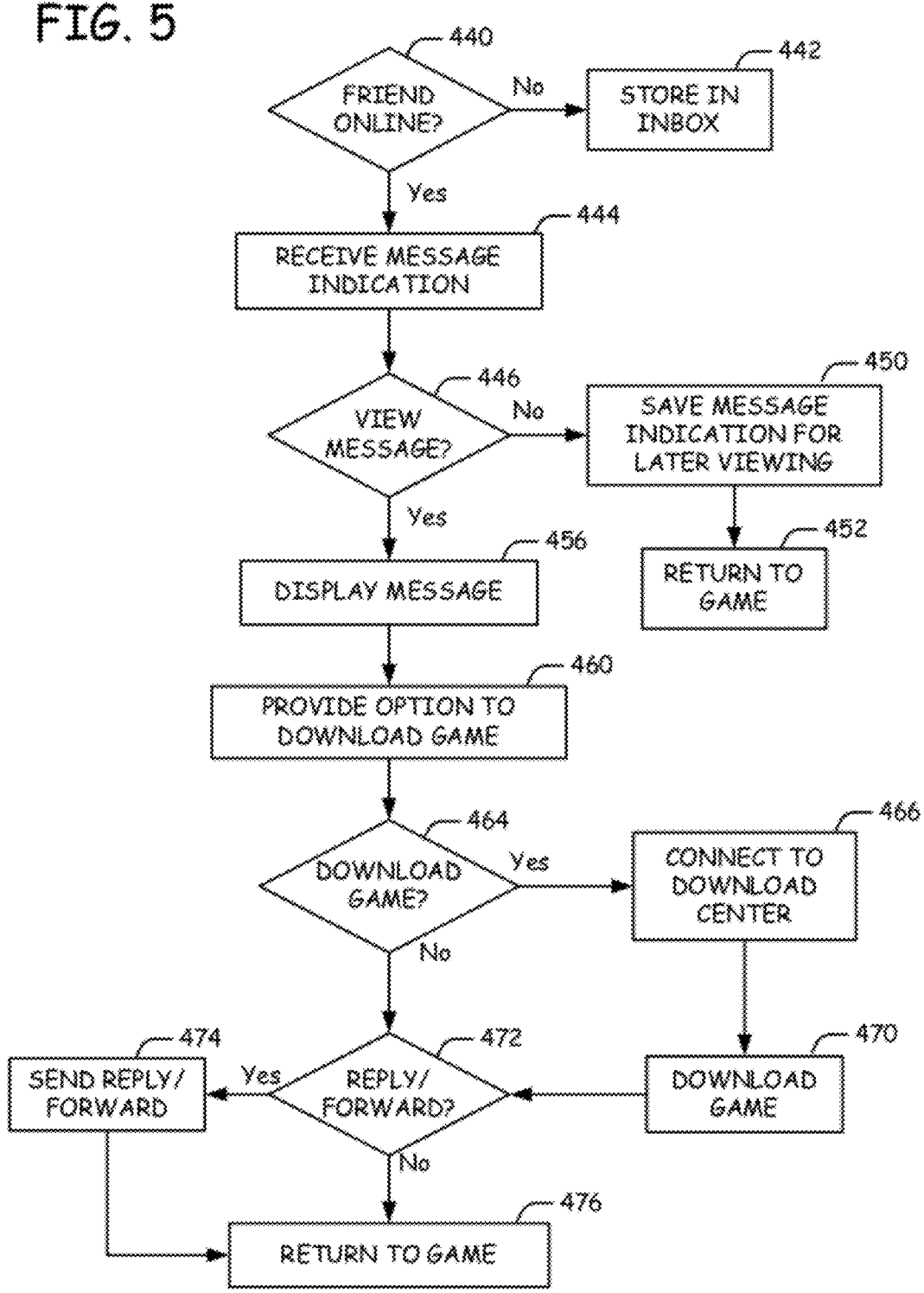
FIG. 5 is a flow diagram of a method for receiving preformed messages and downloading a game.
Figure 7:
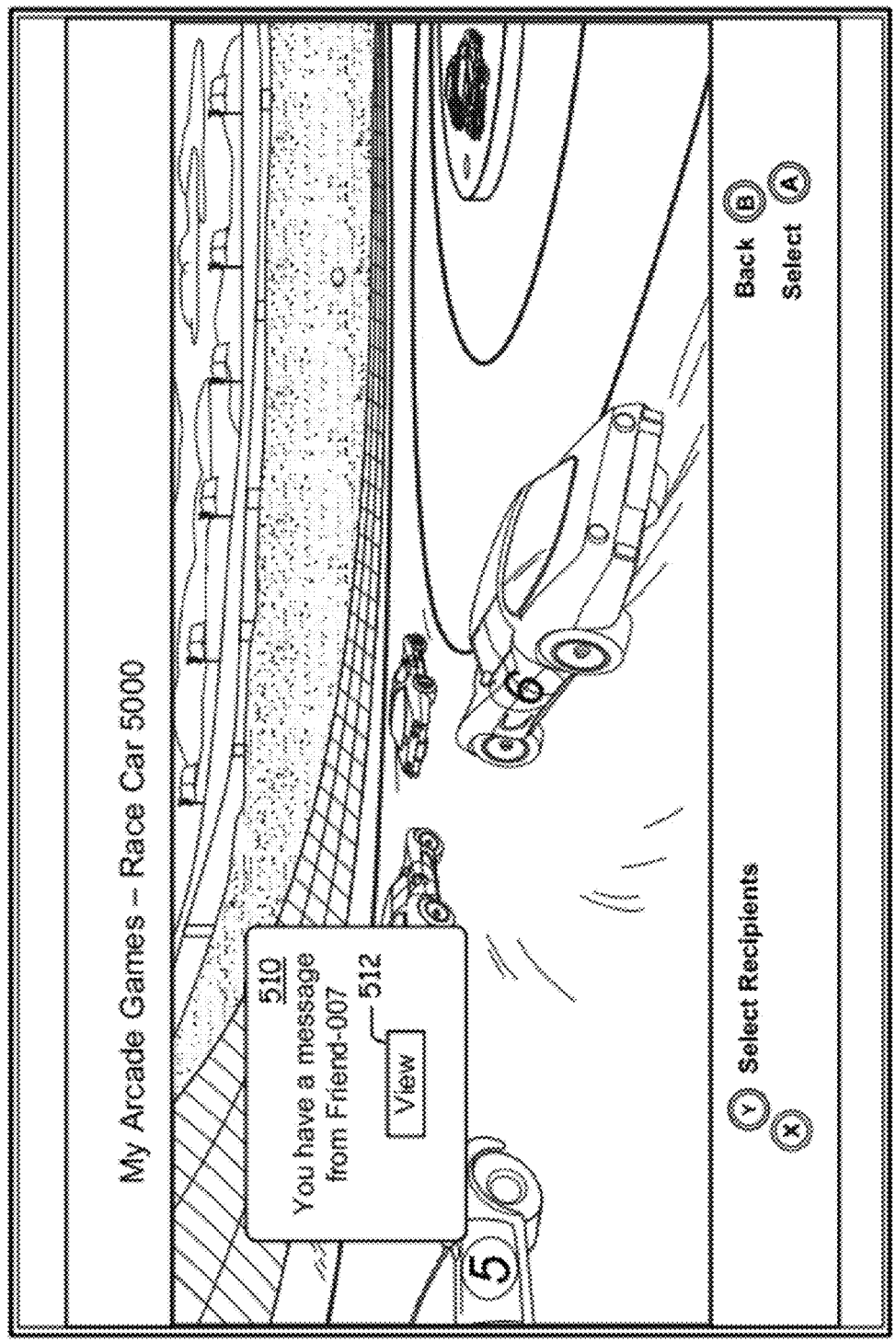
FIG. 7 is an exemplary user interface for receiving an indication of a message according to embodiments of the present system.

FIG. 5 is a flowchart of a method according to the present system by which a recipient of a message, sent by a user according to FIG. 4, may quickly and easily download the game that is the subject of the communication. Upon sending the communication to a recipient, the present system may determine in step 440 whether the recipient is online or not. If the recipient is not online, the mail communication may be stored in the recipient's in-box in step 442. If, however, the recipient is online, the recipient may receive a message indication in step 444. For example, as shown in FIG. 7, the recipient may receive an indication 510 over the recipient's display while the recipient is playing a game. The indication 510 will indicate that the recipient has received a communication and indicate the sender of the communication, for example, "Friend-007" in FIG. 7. The indication 510 may further include an option 512 allowing the recipient to view the message.

Figure 8:
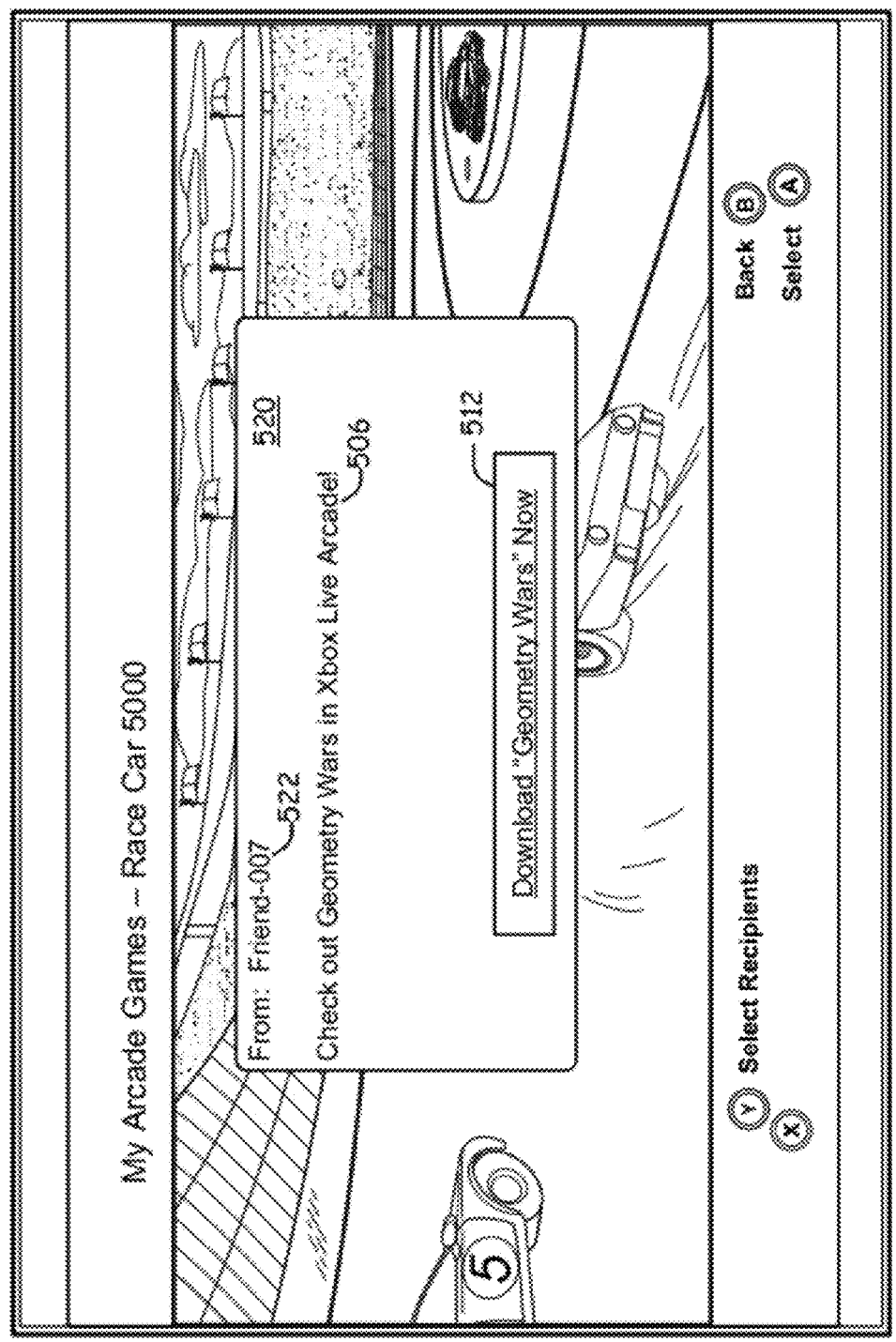
FIG. 8 is an exemplary user interface presenting a message to a recipient together with an option to download a game.

Referring again to the flowchart of FIG. 5, if the recipient elects not to view the message (for example within a predefined period of time), the communication may be stored in the user's in-box in step 450 and the recipient may return to his or her game in step 452. Alternatively, if the recipient elects to view the message in step 446, the message may be displayed in a step 456. For example, as shown in FIG. 8, a message 520 may be displayed over the recipient's gaming interface including a sender field 522 and the one or more preformed messages 506 selected by the sender.

As indicated in the Background section, multiple steps were involved between receipt of a message in which a friend learned of a game and the point at which the friend was able to download the game. According to the present system, in step 460, an option 526 is provided directly in message 520 which allows the recipient to download the game that was being played by the sender of message 520. As indicated in step 432 of FIG. 4, when the user sends the communication, metadata including the name of the game being played by the sender is also sent along with the message. Thus, download option 526 may include the name of the game the sender was playing.

The metadata sent with the message may also include an Internet location from where the game may be downloaded. Thus, in step 464, if the recipient selects option 526 to download the game, the recipient may be connected to the location indicated in the metadata in step 466. This location may for example be Xbox Live Arcade, but it may be other locations in alternative embodiments. Once at the download center, the user may download the game in step 470. In alternative embodiments, the location from where the game may be downloaded may not be omitted from the metadata sent with the communication. In such embodiments, upon selection of the download option 526, the recipient may be connected to Xbox Live Arcade, or some other default location, from where the user may find and download the game.

If the recipient elects not to download the game in step 464, or after the recipient has downloaded the game in step 470, the recipient may reply to message 520 or forward message 520 to other users in step 472. If the user elects to reply to or forward the message, the reply or forward is carried out in step 474. If the message is not replied to or forwarded in step 472, or after the message is replied to or forwarded in step 474, the recipient may return to his or her game in step 476.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A method of facilitating communication between a first and second user via a network messaging system, the first user playing a game, the method comprising the steps of:
    (a) displaying the one or more preformed messages over a display of the first user, the preformed messages including a first portion generic to a plurality of games and a second portion dynamically changing based on a user's progress in the game;
    (b) receiving an indication of at least one of the one or more preformed messages for inclusion in a communication to be sent to the second user;
    (c) transmitting the communication to the second user;
    (d) presenting the communication to the second user; and
    (e) generating an option for the second user, as a result of the transmission in said step (c), for the second user to download the game.

2. The method as claim 1, further comprising the step (f) of transmitting data with the communication transmitted in said step (c) to the second user, the data including an identity of the game.

3. The method of claim 1, wherein said steps (d) and (e) comprise the steps of displaying a communication over a display of the second user together with a link allowing the second user to download the game described within the communication.

4. The method of claim 3, further comprising the step (g) of connecting the second user to an Internet location upon the second user accessing the link, the Internet location allowing the user to download the game.

5. The method of claim 1, wherein a preformed message contains information indicating at least one of:
    (i) the name of the game;
    (ii) the first user's opinion of the game;
    (iii) one or more accomplishments of the first user within the game; and
    (iv) a challenge to the second user to improve upon the first user's accomplishments in the game.

6. The method of claim 1, wherein the step (a) of displaying the one or more preformed messages including a dynamically changing second portion comprises the step of displaying one or more preformed messages including a second portion updated in substantially real time relating to the first user's accomplishments in the game.

7. The method of claim 1, further comprising the step of the second user downloading the game using the option generated in said step (e).

8. A method of facilitating communication between a first and second user via a network messaging system, the first user playing a game, the method comprising the steps of:
    (a) retrieving one or more preformed messages from memory, the preformed messages including a first portion generic to a plurality of games;
    (b) automatically adding information to the one or more preformed messages retrieved in said step (a), the information relating to a user's progress within the game;
    (c) displaying the one or more preformed messages over the display including the dynamic information added in said step (b);
    (d) receiving an indication of at least one of the one or more preformed messages for inclusion in a communication to be sent to the second user;
    (e) transmitting the communication to the second user;
    (f) displaying the communication over a display of the second user together with a link allowing the second user to download the game described within the communication.

9. The method of claim 8, wherein said step (b) of adding information to that preformed messages that is unique to relates to a user's progress within the game comprises the step of adding information that changes in substantially real time based on a user's progress in the game.

10. The method of claim 8, wherein the preformed message retrieved in said step (a) contains information indicating at least one of:
    (i) the name of the game;
    (ii) the first user's opinion of the game;
    (iii) one or more accomplishments of the first user within the game; and
    (iv) a challenge to the second user to improve upon the first user's accomplishments in the game.

11. The method of claim 8, further comprising the step of the second user downloading the game using the link generated in said step (f).

12. A method of facilitating communication between a first and second user via a network messaging system, the first user playing a game, the method comprising the steps of:
    (a) transmitting a communication from the first user to the second user, the communication including a message generated automatically and including information based on the first user's progress in the game, and the communication including a link for the second user to download the game;
    (b) presenting the communication to the second user; and
    (c) receiving an indication to download the game to the second user, based on the second user selecting the link in the communication from the first user.

13. The method of claim 12, wherein a portion of the message includes text generic to a plurality of different instances of the game being played.

14. The method of claim 12, wherein a preformed message contains information indicating a user's opinion of a game.

15. The method of claim 12, wherein a preformed message contains information relating to one or more accomplishments of a user within a game.

16. The method of claim 15, wherein a preformed message contains statements issuing a challenge to the recipient of the message to improve upon the user's accomplishments set forth in the preformed message.

17. The method of claim 12, wherein a preformed message retrieved from memory in said step (a) has been edited and/or added to by the user.

18. The method of claim 12, further comprising the step (e) of connecting the second user to an Internet location upon the second user accessing the link, the Internet location allowing the user to download the game.

19. The method of claim 12, wherein the step (a) of transmitting a communication including a message generated automatically and including information based on the first user's progress in the game comprises the step of updating the information in real time relating to the first user's accomplishments in the game.

20. The method of claim 12, further comprising the step of the second user sending communication to the first user confirming that the second user has downloaded the game.

\* \* \* \* \*